(12) United States Patent
Erb

(10) Patent No.: US 6,241,441 B1
(45) Date of Patent: Jun. 5, 2001

(54) SECURING FIXTURE FOR A SCREW OR A NUT

(75) Inventor: Bernhard Erb, Diemtigen (CH)

(73) Assignee: ABB Alstom Power (Schweiz) AG, Baden (CH)

( * ) Notice: Subject to any disclaimer, the term of this patent is extended or adjusted under 35 U.S.C. 154(b) by 0 days.

(21) Appl. No.: 09/510,356

(22) Filed: Feb. 22, 2000

(30) Foreign Application Priority Data

Feb. 25, 1999 (DE) .................................. 199 08 134

(51) Int. Cl.[7] .............................. F16B 39/04; F16B 39/10
(52) U.S. Cl. ........................... 411/120; 411/87; 411/171
(58) Field of Search .................................. 411/119, 120, 411/121, 123, 87, 171

(56) References Cited

U.S. PATENT DOCUMENTS

| 818,913 | * | 4/1906 | Payne | 411/123 |
|---|---|---|---|---|
| 1,358,496 | * | 11/1920 | Austin | 411/123 |
| 1,498,686 | * | 6/1924 | Farnsworth | 411/123 X |
| 2,472,394 | * | 6/1949 | Barraket | 411/119 |
| 4,906,150 | * | 3/1990 | Bennett | 411/119 |
| 6,027,293 | * | 2/2000 | Beemer et al. | 411/119 |

FOREIGN PATENT DOCUMENTS

| 1720033 | 4/1956 | (DE) . |
|---|---|---|
| 2903706 | 8/1980 | (DE) . |
| 0771955A1 | 5/1997 | (EP) . |

* cited by examiner

*Primary Examiner*—Neill Wilson
(74) *Attorney, Agent, or Firm*—Burns, Doane, Swecker & Mathis, L.L.P.

(57) ABSTRACT

A securing fixture for a screw or a nut includes a holding device for holding the head of the screw or the nut and is provided with a projection which comprises a parting location which can be parted by means of a chisel. The projection also has a projection end which can be welded or adhesively bonded.

7 Claims, 2 Drawing Sheets

SECURING FIXTURE FOR A SCREW OR A NUT

FIELD OF THE INVENTION

The invention relates to the field of attachment engineering. More particularly, the present invention relates to a securing fixture for a screw or a nut.

BACKGROUND OF THE INVENTION

Screws or nuts on machines, for example, are prevented from becoming loose and unscrewed while the machine is operating by fixtures for securing the screws or nuts. Conventional fixtures for securing screws and nuts are disclosed in "Roloff/Matek Maschinenelemente" [Roloff/Matek Machine Components], ninth edition, Vieweg Verlag 1984, pp. 193 ff. By way of example, screws or nuts which are subject to considerable vibrational loads, as may arise in machines, are held by wire securing means which connect the screw or nut which is to be secured to parts of the machine by means of a wire, thus preventing them from becoming loose and unscrewed. However, attaching the wire which is to be used is complex and expensive, particularly with complicated attachments and attachment arrangements which are difficult to reach.

Another possibility of securing screws or nuts so that they do not become loose and unscrewed which is mentioned in "Roloff/Matek Maschinenelemente", ninth edition, Vieweg Verlag 1984, pp. 193 ff. is for the screw to be welded to the nut or for the screw or nut to be welded to a component of the machine. To release this method of securing screws or nuts, it is necessary for the weldjoints to be ground off. This dirties, damages or even destroy surrounding components as a result of the grinding dust. Furthermore, the screws, the screw heads or the nuts are damaged, causing considerable costs if expensive screws made from high-quality material are used. In addition, such grinding work is extremely complex, particularly if the number of screws and nuts which has to be removed, which is often considerable, is taken into account.

Therefore, the object of the invention is to provide a securing fixture for a screw or a nut which can be applied in a particularly simple manner and can be released very easily and at little cost, without significant production of dirt.

The securing fixture according to the invention is of disk-like design and has a holding device for holding a screw or nut which is to be secured. Furthermore, the holding device comprises at least one projection, the end of which can be welded or adhesively bonded to a component of a machine, for example. This corresponding projection advantageously has a parting location which does not lie in the area of rotation of the nut or the head of the screw. The welded or adhesively bonded end of the projection can advantageously be parted from the remaining part of the projection very easily and quickly and virtually without causing dirt, and the securing fixture can thus be removed, by simply applying a chisel to this parting location. Moreover, a screw or nut is in no way damaged or destroyed, since rounding of the edges of the bead of the screw or the nut caused by turning is prevented. Embodiments of the securing fixture have a plurality of projections which are arranged radially in the plane of the holding device or at any desired angle to the holding device. Such attachments allow the securing device to be arranged on and fixed to a component, in particular a component of a machine, which is difficult to reach, by welding or adhesive bonding. With the aid of these embodiments of the projections of the securing fixture according to the invention, it is possible for screws or nuts to be secured in a flexible manner and under any stipulated spatial conditions and, if appropriate, to be removed again with great ease.

BRIEF DESCRIPTION OF THE DRAWINGS

The invention is explained in more detail with reference to exemplary embodiments and in conjunction with the drawing, in which.

The reference numerals used in the drawing and their meaning are compiled in the list of reference numerals. In principle, identical parts are provided with identical reference numerals throughout the figures.

DETAILED DESCRIPTION OF THE PREFERRED EMBODIMENTS

Figure 1A:
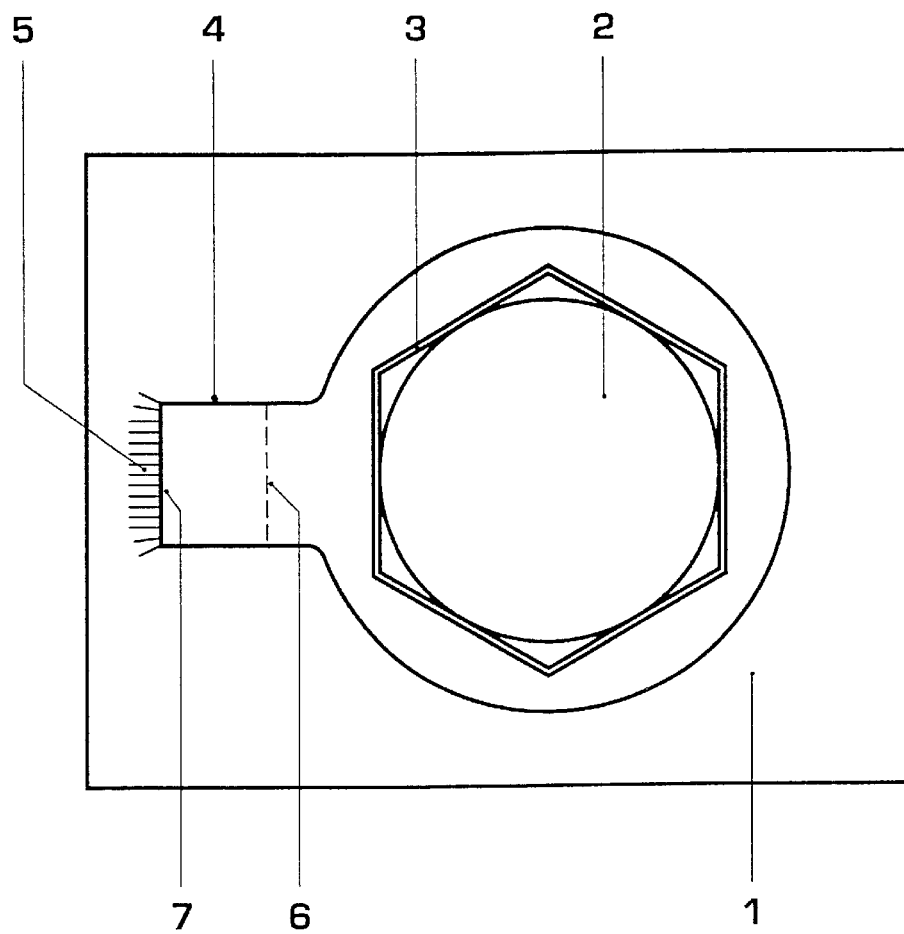
FIG. 1a shows a plan view of an exemplary embodiment of a securing fixture with a projection arranged radially in the plane of the holding device.

FIG. 1a shows a plan view of an exemplary embodiment according to the invention of the securing fixture fox a screw or nut. The securing fixture is of disk-like structure and comprises a holding device 3 for holding a head of a screw 2 or a nut. In the exemplary embodiment shown in FIG. 1a, this holding device 3 is provided with a hexagon socket and surrounds and is flush with a head of a standard hexagonal screw 2. Therefore, with the aid of the holding device 3 the securing fixture can be attached rapidly and without problems to the screw 2 or nut which is to be secured, and the screw 2 or the nut can be secured in a form-fitting manner.

On the holding device 3, the securing fixture has at least one projection 4 which is connected to the holding device 3. The projection 4 ends at a projection end 7 which can be welded and/or adhesively bonded. The securing fixture shown in FIG. 1a is fixed to a component 1 via a welded or bonded joint 5 by means of this weldable or bondable projection end 7. The material of the projection 7 is to be matched to the base material of the component 1, so that welding and/or adhesive bonding is made easier and cracking is avoided. The projection end 7 advantageously does not lie in the area of rotation of the head of the screw 2 or the nut which is to be secured, since otherwise the head of the screw 2 or the nut would be damaged as a result of the securing fixture being fixed by means of welding and/or adhesive bonding.

In addition, the projection 4 comprises a parting location 6 which can be parted by means of a chisel. However, it is also entirely conceivable for the parting location 6 to be parted by grinding, cutting or flame cutting. This parting location 6 is arranged on the projection 4 in such a way that it does not lie in the area of rotation of the nut or the head of the screw 2. This ensures that the screw 2 or the nut which is to be secured is not damaged or destroyed when the adhesively bonded and/or welded projection end 7 is parted from the remaining projection 4, since rounding of the edges of the head of the screw 2 or the nut caused by turning is prevented. Advantageously, the parting location 6 is designed as a predetermined breaking location, so that severing by means of a chisel at the parting location 6 can be completed easily, quickly and virtually without causing any dirt.

Figure 1B:
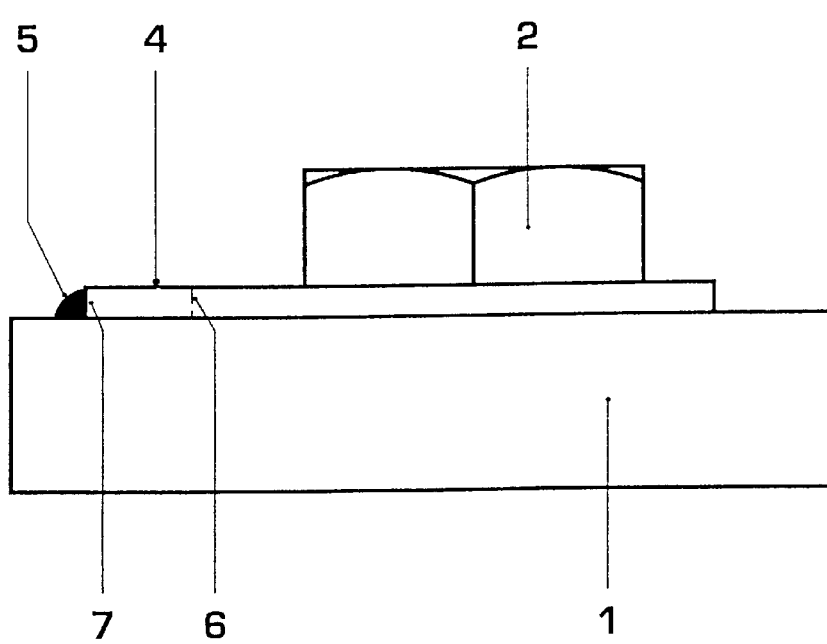
FIG. 1b shows a front view of the exemplary embodiment of the securing fixture shown in FIG. 1a, FIG. 2 shows a front view of a further exemplary embodiment of a securing fixture with two projections arranged at any desired angle to the holding device.

The projection 4 of the securing fixture shown in FIG. 1a is arranged radially in the plane of the holding device 3. Such a configuration of the projection 4 is particularly suitable for fixing the securing fixture to the planar surfaces of components by welding or adhesively bonding the attachment end 7 to the component 1, as shown by the front view of FIG. 1b, However, the securing fixture may advantageously also have a plurality of projections, not all of which are used to fix the securing device when it is being attached. This ensures that a single securing fixture can be used a number of times. Trapezoidal, triangular, banana-shaped, etc. projections are also conceivable and can be chosen according to the demands imposed on the component.

Figure 2:
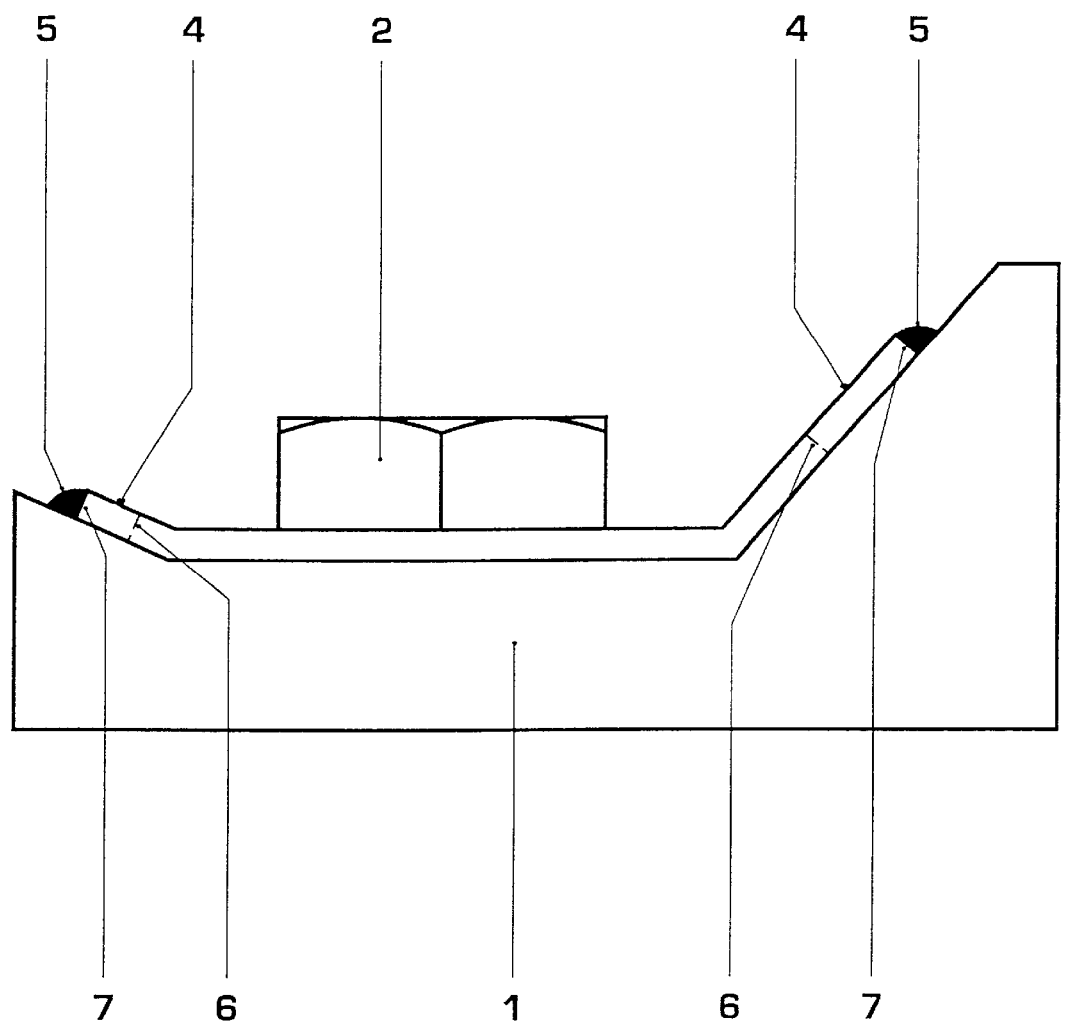

A further exemplary embodiment is illustrated in FIG. 2, in which the securing fixture is designed with two projections 4, each projection 4 being arranged at any desired angle to the holding device 3. This embodiment of the securing fixture which is shown in FIG. 2 is very particularly suitable for a component 1 in which the screw 2 or nut which is to be secured is arranged at a position which is difficult to reach. Therefore, the variable angle of the projections 4 with respect to the holding device 3 enables the securing fixture to be flexibly adapted to the spatial conditions, so that attaching and in particular removing the fixture requires only very little effort.

Further exemplary embodiments (not shown), in which the holding device 3 surrounds a nut instead of a conventional screw 2, are also conceivable. Furthermore, it is possible to imagine a holding device (not shown) which has a polygon socket for holding a polygonal screw head or a polygon nut, or alternatively a holding device (not shown) which has a polygon head for holding, for example, a conventional socket-head screw.

What is claimed is:

1. A securing fixture for a screw or nut, the securing fixture being of disk-like design and being provided with a holding device for holding the head of the screw or the nut, wherein the holding device has at least one projection with a parting location, and in that the parting location is not in the area of rotation of the head of the screw or the nut, the parting location comprising a predetermined breaking location which may be severed more easily than other parts of the holding device.

2. The securing fixture as claimed in claim 1, wherein the parting location can be parted by means of a chisel, by cutting, by grinding or by flame cutting.

3. The securing fixture as claimed in claim 1, wherein the projection has a projection end which is not in the area of rotation of the head of the screw or the nut.

4. The securing fixture as claimed in claim 3, wherein the projection is arranged radially in the plane of the holding device.

5. The securing fixture as claimed in claim 3, wherein the projection is arranged at any desired angle to the holding device.

6. The securing fixture as claimed in claim 1, wherein the projection end can be adhesively bonded and/or welded.

7. The securing fixture as claimed in claim 1, wherein the holding device comprises a polygon head or a polygon socket.

* * * * *